United States Patent
Gort

(10) Patent No.: US 10,743,631 B1
(45) Date of Patent: *Aug. 18, 2020

(54) TANGLE FREE PROTECTIVE ROLL AND JEWELRY ORGANIZER

(71) Applicant: Pamela J Gort, Oceanside, CA (US)

(72) Inventor: Pamela J Gort, Oceanside, CA (US)

(*) Notice: Subject to any disclaimer, the term of this patent is extended or adjusted under 35 U.S.C. 154(b) by 256 days.

This patent is subject to a terminal disclaimer.

(21) Appl. No.: 15/904,383

(22) Filed: Feb. 25, 2018

Related U.S. Application Data

(63) Continuation-in-part of application No. 14/617,817, filed on Feb. 9, 2015, now Pat. No. 9,930,948.

(Continued)

(51) Int. Cl.
*A45C 11/26* (2006.01)
*A45C 13/02* (2006.01)
(Continued)

(52) U.S. Cl.
CPC .............. *A45C 11/26* (2013.01); *A45C 11/16* (2013.01); *A45C 13/02* (2013.01); *B65D 75/02* (2013.01)

(58) Field of Classification Search
CPC ... B32B 2307/744; A45C 3/004; A45C 11/16; A45C 11/26; A45C 13/002; A45C 2007/0004; A45C 2007/0009; A45C 2007/0013; B65B 11/56; B65B 29/08; B65D 65/42; B65D 65/44; B65D 75/02; A63F 2009/105; A63F 2009/1055; A63F 2003/0025

(Continued)

(56) References Cited

U.S. PATENT DOCUMENTS 2,502,033 A * 3/1950 Bohn ............... A45C 3/004
206/293
3,525,376 A 8/1970 Muhlhauser
(Continued)

OTHER PUBLICATIONS

Friction and Friction Coefficients [online], 2004, Engineering ToolBox, 8pgs [retrieved on Dec. 30, 2019]. Retrieved from the Internet: <URL: https://www.engineeringtoolbox.com/friction-coefficients-d_778.html>. (Year: 2019).*

(Continued)

*Primary Examiner* — Stephen F. Gerrity
*Assistant Examiner* — Joshua G Kotis
(74) *Attorney, Agent, or Firm* — Invention To Patent Services; Alex Hobson

(57) ABSTRACT

A tangle free protective roll and jewelry organizer includes a piece of pliable decorative materials upon which an extended piece of pliable inner material is attached. The inner material has an attachment material with a high coefficient of friction material on the inner and outer surfaces. Whereupon rolling of the inner material with items thereon, secures these item to the attachment material. The items are secured in place with contact around the item with the attachment material, thereby preventing the items from rubbing against each other and causing scratches, tangling or other damage. The protective roll improves the packing process and simplifies it to a matter of laying the items on the attachment material of the inner material and simply rolling the inner material up. A traveler can safely pack their jewelry for example in a quick and convenient manner.

18 Claims, 18 Drawing Sheets

Related U.S. Application Data

(60) Provisional application No. 61/937,474, filed on Feb. 8, 2014.

(51) Int. Cl.
   *A45C 11/16* (2006.01)
   *B65D 75/02* (2006.01)

(58) Field of Classification Search
   USPC ....... 383/4; 206/6.1, 225, 226, 581; 224/901
   See application file for complete search history.

(56) References Cited

U.S. PATENT DOCUMENTS

| | | | |
|---|---|---|---|
| 4,223,783 A | 9/1980 | Marshal | |
| 4,735,246 A | 4/1988 | Niehaus | |
| 4,865,097 A * | 9/1989 | Allen | B65D 65/02 |
| | | | 150/154 |
| 4,930,635 A | 6/1990 | Hotchkiss et al. | |
| 4,958,727 A | 9/1990 | Bergeron | |
| 4,970,821 A | 11/1990 | Young | |
| 5,121,833 A | 6/1992 | Lindsay et al. | |
| 5,363,953 A | 11/1994 | Carter | |
| 5,375,707 A * | 12/1994 | Richer | A63F 9/1044 |
| | | | 206/315.1 |
| 5,427,230 A | 6/1995 | Mattox | |
| 2,723,485 A | 11/1995 | Pederson | |
| 5,599,617 A * | 2/1997 | Ewald | A61L 15/425 |
| | | | 428/317.3 |
| 5,779,033 A | 7/1998 | Roegner | |
| 7,086,533 B1 * | 8/2006 | Enko | A63F 9/1044 |
| | | | 206/315.1 |
| 9,491,995 B1 * | 11/2016 | Sichi | A45C 11/16 |
| 9,930,948 B2 * | 4/2018 | Gort | A45C 11/26 |
| 2004/0088788 A1 | 5/2004 | Alane | |
| 2004/0118726 A1 * | 6/2004 | Meyer | A45C 11/26 |
| | | | 206/419 |
| 2004/0232035 A1 * | 11/2004 | Hume | A45C 11/008 |
| | | | 206/581 |
| 2007/0148409 A1 * | 6/2007 | Rios | A43B 13/22 |
| | | | 428/167 |
| 2010/0183814 A1 * | 7/2010 | Rios | E04F 15/02161 |
| | | | 427/387 |
| 2013/0209624 A1 * | 8/2013 | Wollmann | B65D 81/343 |
| | | | 426/132 |
| 2013/0256159 A1 * | 10/2013 | Walsh | A45C 11/16 |
| | | | 206/6.1 |
| 2014/0021091 A1 * | 1/2014 | Egli | B65D 65/38 |
| | | | 206/736 |

OTHER PUBLICATIONS

Screen captures from YouTube video clip entitled "How to use Puzzle Buddy. Jigsaw Puzzle Mat. To Order . . . " 1 page, uploaded on Apr. 14, 2013 by user "PuzzleBuddy1". Retrieved from Internet (on Apr. 10, 2020): <https://www.youtube.com/watch?v=MtUGKKmrZjA>. (Year: 2013).*

Screen captures from YouTube video clip entitled "Puzzle Roll-Up Mat Keeps Pieces in Place " 1 page, uploaded on Jan. 11, 2016 by user "BulbHead". Retrieved from Internet (on Apr. 10, 2020): <https://www.youtube.com/watch?v=Ugfx9WmllkU>. (Year: 2016).*

\* cited by examiner

TANGLE FREE PROTECTIVE ROLL AND JEWELRY ORGANIZER

CROSS REFERENCE TO RELATED PATENT APPLICATIONS

This application is a continuation in part of U.S. patent application Ser. No. 14/617,817, filed on Feb. 9, 2015 and currently pending, which claims the benefit of U.S. provisional patent application No. 61/937,474, filed on Feb. 8, 2014 and entitled "TANGLE FREE PROTECTIVE ROLL AND JEWELRY ORGANIZER", the contents of both application are incorporated by reference herein.

BACKGROUND OF THE INVENTION

Field of the Invention

The embodiments described generally relate to small travel luggage and jewelry carrying cases. The contemplated embodiments more specifically pertain to an improved jewelry and delicate item carrying system when transporting items in luggage, and carry-on items such as purses, briefcases or gym bags; anywhere a person goes that they want to carry jewelry with them.

Background

There are many different vehicles for carrying jewelry including watches, necklaces, rings, earring and bracelets. The most common typically are pouches or boxes that contains multiple internal pockets, hooks and other attachments to hold necklaces, earrings and rings in a specific place so they will not move around during transport. These designs require significant time to set aside for packing and unpacking of the jewelry. In addition, the size limiting zippered pockets in many of these cases do not allow for travel with bulky or large pieces. Another current problem with the art is that the pieces in the zippered pockets often get tangled or damaged in transport. In fact, in a 2013 survey (Survey Monkey) of 67 women asked "What is the one thing you don't like about your current jewelry travel case"—the top 3 responses were 1) jewelry gets tangled or ruined—40%, 2) too small for my jewelry—23% and 3) too consuming to pack 15%. Therefore, the major challenges or current limitations around travelling with jewelry are time to pack, potential for damage and inability to bring bulkier pieces.

There are also box types or cylindrical cases into which one places their items in compartments or trays. These also introduce the element of tangling and difficulty seeing what you have with you. Items can easily be lost. These typically have small trays for earrings and rings but they are not secured and the rigid structure does not lend itself to easy packing into a purse or briefcase. In addition, the limitations associated with multiple compartments of various sizes and rigidities requires the traveler to spend significant time organizing the items into the right compartments for each of the items. Thus, it is time consuming when packing, and often with multiple isolated compartments, items are misplaced or lost when unpacking because not every zippered compartment or box was thoroughly checked upon returning from a possibly arduous trip.

Unfortunately, a tangle free protective roll and jewelry organizer has not yet been described. Although, there are multiple kinds of jewelry carrying products in existence these products rely on a plurality of pockets which complicate the packing and unpacking process and introduces the potential for damage. None offer the simple design and ease of use and functionality as presented in the described embodiments. Thus, a need exists for a highly adaptable jewelry roll that 1) cushions and holds pieces securely; 2) can accommodate larger, bulkier items which generally do not fit in the zippered pockets found in the current products in the art; 3) can be easily and quickly packed and unpacked; 4) could easily fit in a hotel room safe, purse or briefcase; and 5) is easy to use at travel destinations (hotel, gym, office). In addition, the embodied roll is adaptable "as is" to carrying a variety of rings, watches and earrings as well as necklaces and bracelets of varying lengths and bulk.

SUMMARY OF THE INVENTION

The objective of the embodiments described are to provide an easily transportable, compact, and cushioned travel roll capable of carrying all types and sizes of jewelry and other delicate or easily damaged and tangled items without multiple compartments and/or attachments which complicate the packing process. The allure of the contemplated embodiments is the simplicity of use, function and protection for the user. Additional embodiments feature a decorative outer material, which gives an attractive rich look and feel combined with a high coefficient of friction almost tacky functional inner material which prevents items from shifting and sliding during transport.

An exemplary attachment material has is a high coefficient of friction material having a static coefficient of friction of about 0.5 or higher and preferably about 0.7 or higher, and more preferably about 0.9 or higher, according to ASTM 1894, when tested against a metal surface, such as aluminum, or an aluminum sheet or plate. A friction tester, FPT-H1, available from Mecmesin Limited. UK, may be used to perform the friction testing according to ASTM 1894 to determine the static coefficient of friction of the attachment material with a metal surface, such as aluminum. This high coefficient of friction is important to keep the items retained therein, such as jewelry from sliding during transport.

The contemplated embodiments enable the user to easily secure and cushion jewelry or other delicate items without having to spend time organizing which items should go in which compartments or attaching items or placing them in zippered pockets.

Another embodiment of the disclosure features a travel roll comprising a first outer material which is generally in the shape of a smaller rectangular piece of a pliable decorative material upon which a longer second inner material comprising a high coefficient of friction attachment material is attached by an attachment means including, but not limited to, glue, stitches, staples or rivets. The attachment material may be pliable and tacky or have adherence properties to secure items thereto. The embodied first outer decorative material can be almost any natural or synthetic fabric or skin currently used in clothing or baggage products. The size of the first outer material has a typical range from about 4×7 inches to about 25×40 inches. The embodied inner high coefficient of friction material can be any material with anti-slip or limited adherence properties, and optionally also includes a cushioning component such as the anti-slip rubberized material often found in shelf lining systems. The size of the second inner material has a typical range from about 5×10 inches to about 30×40 inches. Upon attaching the longer rectangular piece of the second inner material to the first outer material the longer second inner material extends beyond the decorative first outer material so that when the full coverage of the jewelry or protected items is achieved either by folding the extended piece of inner material over the items before rolling or placing the items on the extended piece of inner material and then rolling the material such that only the inner material comes in direct contact with the items to be protected.

In some embodiments the longer piece of inner material extends beyond the decorative material so that when the items are rolled up in the roll the rubberized inner material contacts the items thus holding them in place securely and preventing the jewelry items from potentially rubbing against each other, thus eliminating scratches, tangling or other damage. Current products known in the art generally require the use of a plurality of pockets or pouches to separate goods from rubbing and maintaining product placement. Additionally, when unpacking the user must try to remember to check all of the little hidden compartments to find all of their items. The present contemplated embodiments achieve better protection of goods by laying the items out on the rubberized material for easy visualization of goods present. The roll is laid out on a flat dry surface, the chosen items are placed perpendicular on the rubberized inner material approximately an inch (or width of the article being packed) apart in packing. Next, the roll is tightly rolled up starting at the cushioning material edge toward the decorative material end. In additional embodiments straps may be connected to the opposite end of the outer surface away from the end with the extended inner material. Once an embodied roll is rolled up the straps may be used to maintain the roll in a tightly rolled storage position. Additional embodiments may utilize non-attached straps, hair-ties, belts, ties or even other more robust jewelry such as larger bracelets, bangles or watches to maintain the roll in the closed rolled up position. At the destination, the travel roll straps are untied or other securing fasteners are undone, and the roll is simply unrolled onto a flat surface and the chosen item(s) are lifted out to wear at the destination. The roll is then rolled back up, secured in the closed storage position and placed safely in a safe, purse, briefcase or other location.

An exemplary attachment material may comprise a natural or synthetic rubber and may be elastomeric and resilient. The attachment material may be soft to conform around the items retained therein and protect them from damage due to impact to the outer surface of the travel roll. An exemplary attachment material comprises a polymer and may be a film, or sheet of polymer. An exemplary attachment material is fabric, such as a woven fabric having a high friction coating thereon, such as a PVC compound coating, such as a Grip PVC liner, available from Kittrich Corporation, Pomona Calif. The polymer may comprise urethane, silicone, nitrile, styrene block copolymers, ethylene-vinyl acetate, polyvinyl chloride (PVC) and the like. An attachment material may be pressure sensitive adhesive material, PSA, wherein items will loosely adhere with the application of pressure to the attachment material. A PSA type attachment material may be an elastomer compounded with a suitable tackifier (e.g., a rosin ester). An exemplary attachment material may comprise a bio-based materials, butyl rubber, ethylene-vinyl acetate (EVA), natural rubber, nitriles, silicone rubbers, requiring special tackifiers based on "MQ" silicate resins, composed of a monofunctional trimethyl silane ("M") reacted with quadrafunctional silicon tetrachloride ("Q").

The attachment material may be elastic wherein it may be deformed from an original shape or dimension and then recover or return substantially to said original shape after removal of a deforming load. The deforming load may be below a yield load for example. Substantially recover to an original shape, as used herein, means that the material will return to 90% of the original shape or dimension within about 60 seconds of the removal of the load, wherein the load is only applied for 60 seconds or less. For example, an exemplary sheet of attachment material may be stretched from an original length to a stretched length by the application of a tensile load that is no more than 50% of a yield load and held for no more than 60 seconds and then released and the attachment material will spring back to an original length or shape, within 90% of the original length within 60 seconds.

An exemplary attachment material may be soft and compliant wherein it can conform at least partially around an item, such as a piece of jewelry. An exemplary attachment material has a Shore A value of no more than about 50, or a Shore 00 of no more than about 70, and preferably a Shore 00 of no more than about 50. An exemplary attachment material may have a thickness of about 6 mm or less, about 3 mm or less, about 2 mm or less, and more than about 1 mm, such as between about 1 mm and 4 mm. The thickness of the attachment material combined with the softness may enable items, such as jewelry, to be secured by the attachment material conforming and deforming around the item.

Test Summary

Test standard ASTM D1894 enables the calculation of the static and kinetic (dynamic) coefficient of friction, p, between two surfaces, using a horizontal plane and sled. This standard is applicable to plastic films and sheeting. Film is defined as material less than 0.254 mm thick and sheeting defined as being thicker than this dimension. The data obtained is applicable to the engineering design of plastic films used in packaging applications. The effect of temperature is considered and heating of the plane to temperatures other than 23° C.

Test Procedure

ASTM D1894 determines the friction characteristics of the film sliding over itself or other substances. Several designs of apparatus are permitted.

Test Apparatus, (Mecmesin Limited FPT-H1 or equivalent test apparatus for ASTM 1894)

Horizontal test plane, of polished plastic, wood or metal sheet approx. 150×300 mm, optionally heated. A smooth piece of glass may cover upper surface of plane.

Sled of mass 200±2 g, horizontal area dimensions 63.5 mm×63.5 mm and approx. 6 mm thick. When a flexible film is tested, the sled base must be wrapped in sponge rubber (the characteristics specified).

A driving mechanism to produce a relative motion between the sled and the test table.

A force measurement system where the pulling direction shall be in straight alignment with the frictional plane.

Elastic link to the sled. Use the rigid link to control stick-slip, if apparent

Preparation

Cut the sample to be attached to the plane to 250 mm×130 mm, usually in its machine direction and transverse direction respectively, to test. Sliding in the specimen's machine direction. Attach securely via gripping. The test piece to be attached to the sled is cut to 120 mm square if the specimen is defined as a film, and 63.5 mm square if defined as sheeting. Attach the samples to the sled with single-sided and double-sided tape respectively. Take care not to contaminate the test pieces by handling or foreign matter and condition according to ASTM D618.

Method

1. Attach the sled to the coefficient of friction tester crosshead. Allow time for stable temperature conditions to be achieved if conducting the test above 23° C.

2. Start the driving mechanism, set to a speed of 150±30 mm/min (6.0±1.2 in./min).

3. Record the initial maximum force reading, which is the static frictional force.

4. Once sliding has initiated, continue to run for at least another 130 mm and average the force, representing kinetic friction.

5. It may be necessary to record the static and kinetic friction forces in separate tests if stick-clip occurs, by using a rigid link between the sled and the tester crosshead.

6. Discard the samples and repeat the test until five valid sets of results are recorded.

Calculation

Calculate the coefficient of friction from the formula: $\mu=F/mg$, where mg is the sled weight. Calculate the mean of the set of observations and the standard deviation.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
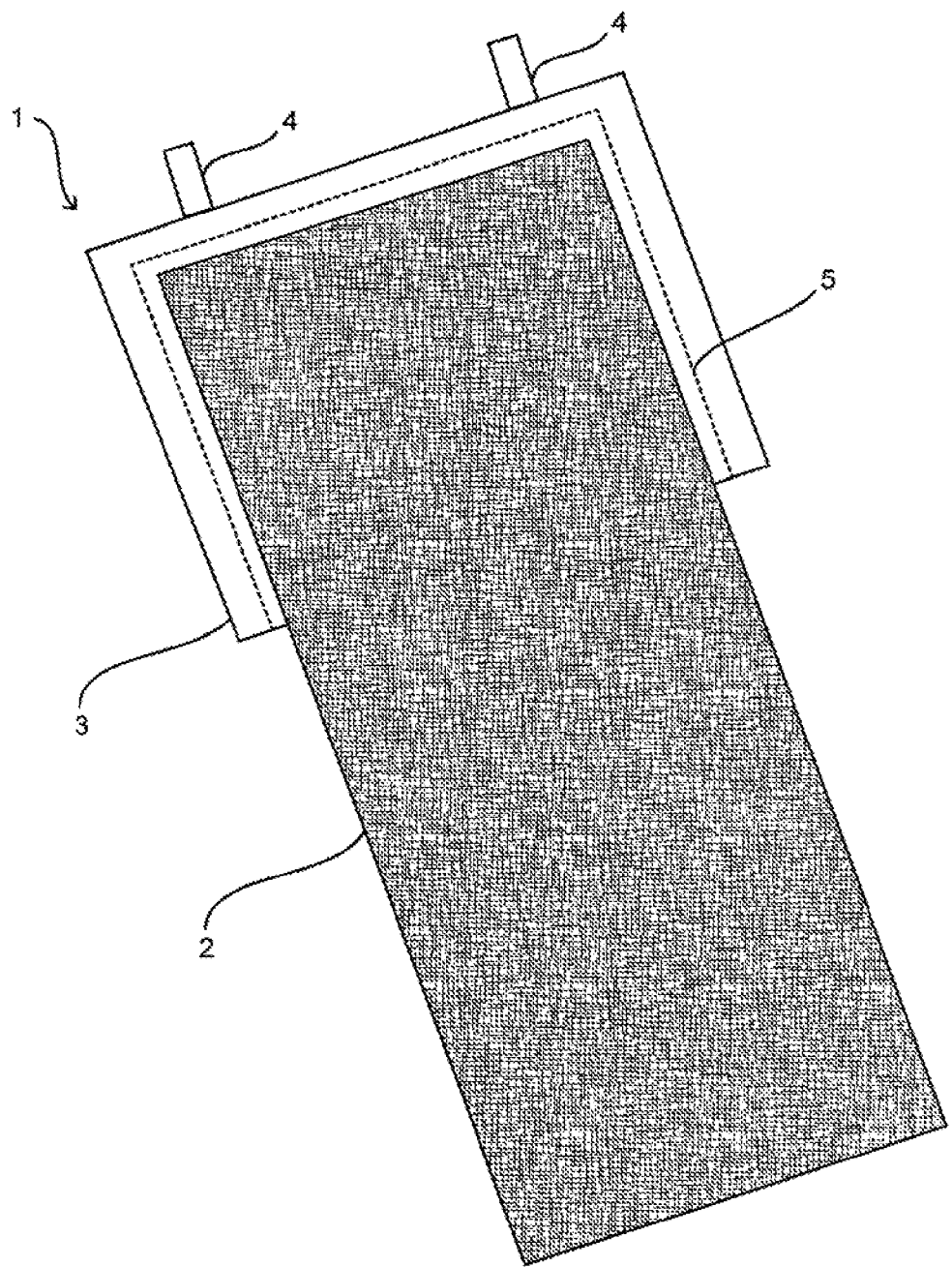
FIG. 1 is a drawing showing the interior side of an embodied roll from the interior or inner side in its unrolled position.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes." "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Although, the general features of the embodied rolls are ideal for use with jewelry as described in the present figures, the roll may be further used with other materials such as fishing tackle and hooks, hobbyist tools and components, such as needlework, beading and knitting materials and small electronics including headsets, chargers and the like.

Figure 2:
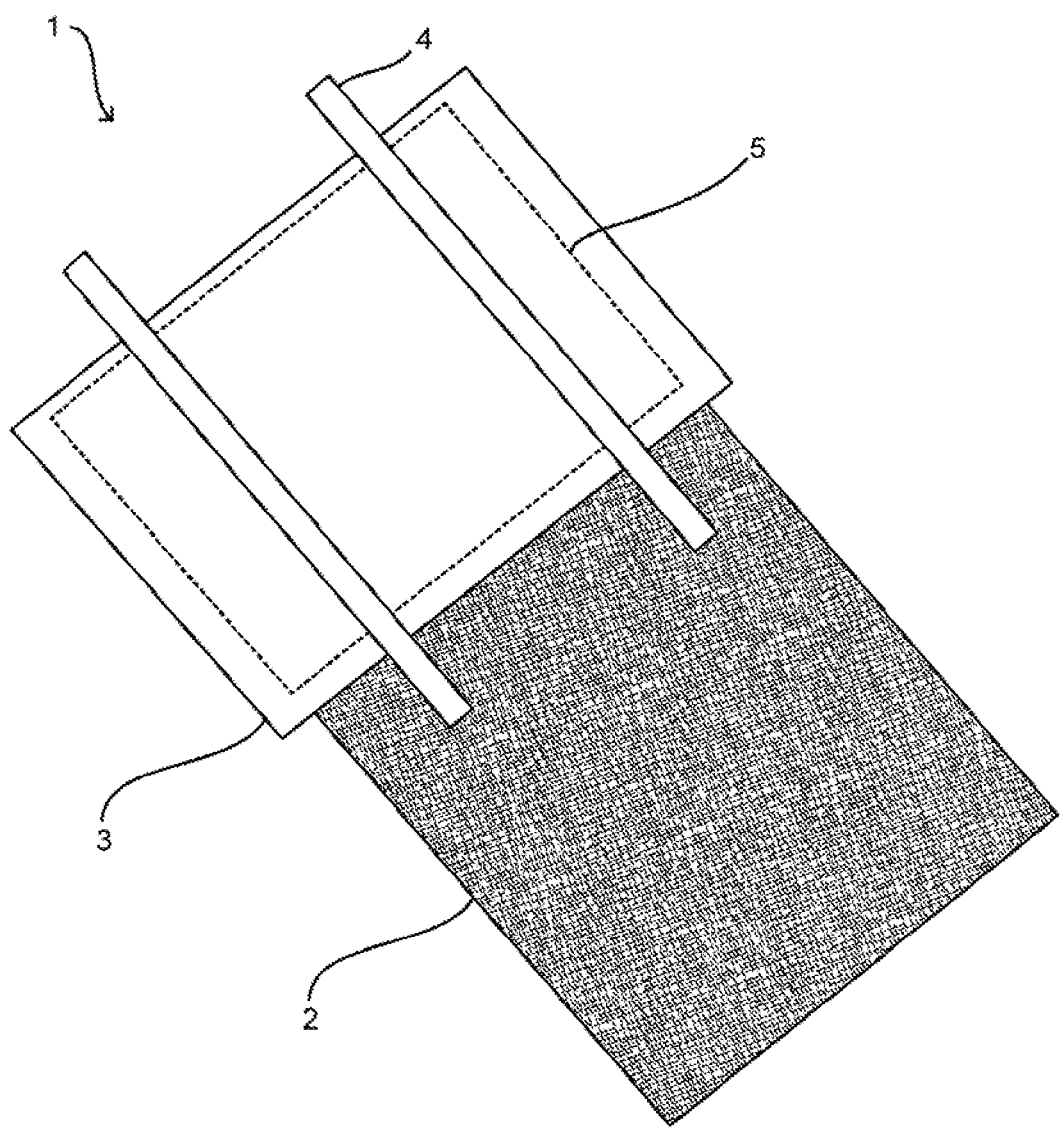
FIG. 2 is a drawing showing the exterior side of the embodied roll of FIG. 1 in its unrolled position.
Figure 3:
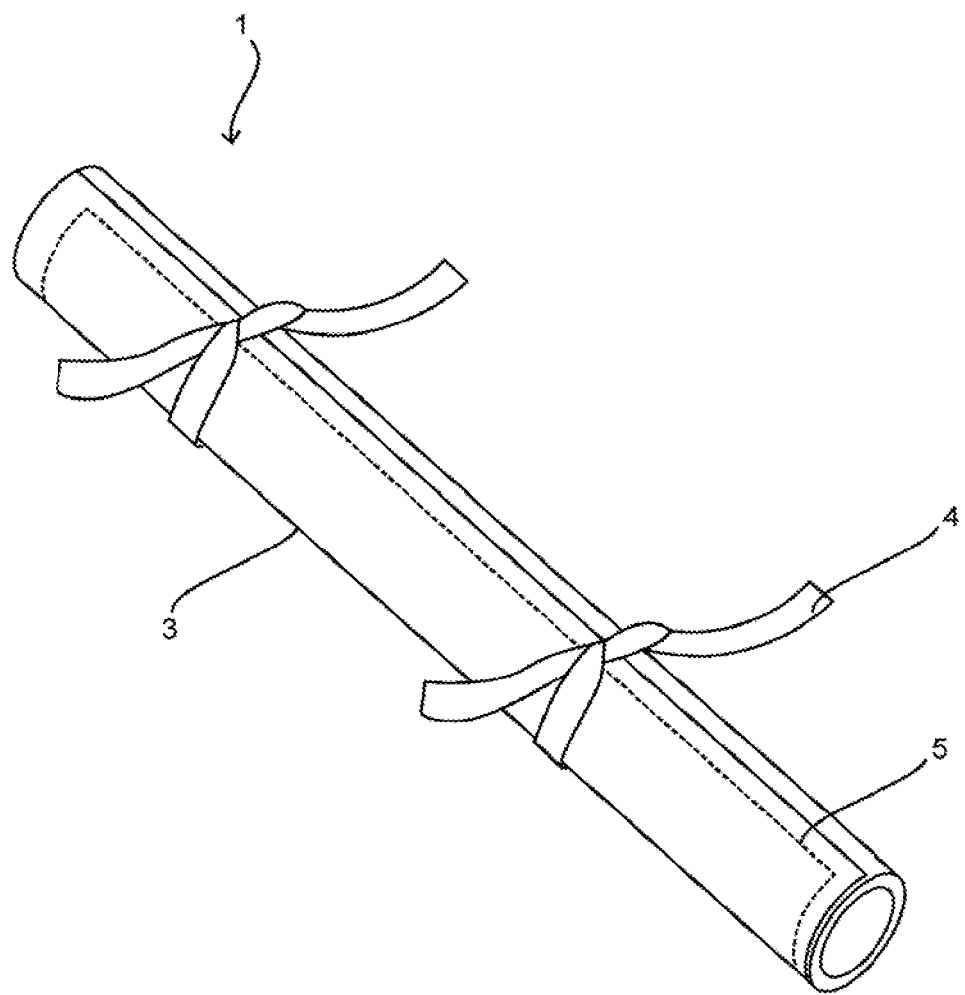
FIG. 3 is a drawing showing the exterior of the embodied roll of FIGS. 1 and 2 in the rolled up stored position with securing straps tied and secured.

The embodiments presented have two contemplated formats both relating to the inner material 2. In one format inner material 2 is a single layer of thickness throughout the piece (as shown in FIGS. 1-3). In a second embodiment (as shown in FIGS. 4-7 and FIGS. 11 and 12) the inner material 2 is two layers thick starting at the joining of the outer material 3 end and extending inward to create a pouch 106. The pouch may be in a range of 2-8 inches deep depending on the overall size of the roll, but preferred ranges will generally be in the 4-5 inch range. The inner material 2 is folded at one end and the folded area is the part that is the long edge sewn over the decorative fabric outer material 3. Proceeding from the edge is 3-4 inches of two layers of cushioned inner material 2 creating a flap or pocket-like area or pouch 106. This pouch may function as a location for the storage of smaller items such as rings or earrings which may be inserted for maximum protection and securely held into place.

Additional embodiments may include added accessories which work in concert with the roll to complement its capabilities. These additional embodiments, may feature a finger (see FIGS. 13-15) or wrist (see FIG. 16) prosthesis, or an earring holder (see FIGS. 17 and 18). A ring holder embodiment features a finger prosthesis 10 which may be made of any material as long as the prosthesis is capable of allowing a variety of rings 8 to be maintained in place on the prosthesis 10 until removed by the user. One preferred embodiment includes a rolled up piece of the high coefficient of friction material 11 (similar or the same as used for inner material 2) into about the size of a human finger. Thus, there are multiple placement options for rings 8 in the embodied rolls. One placement option includes merely placing the rings 8 on the protective inner material 2 and rolling up, a second placement option includes placing rings 8 in the optional pouch 106, a third placement option includes placing rings 8 on a finger prosthesis 10 and placing on the roll, and a fourth placement option includes placing the finger prosthesis 10 in the pouch 106. The finger prosthesis 10 is made to hold the rings 8 onto a roll so that they can be more securely held together and seen.

Figure 10:
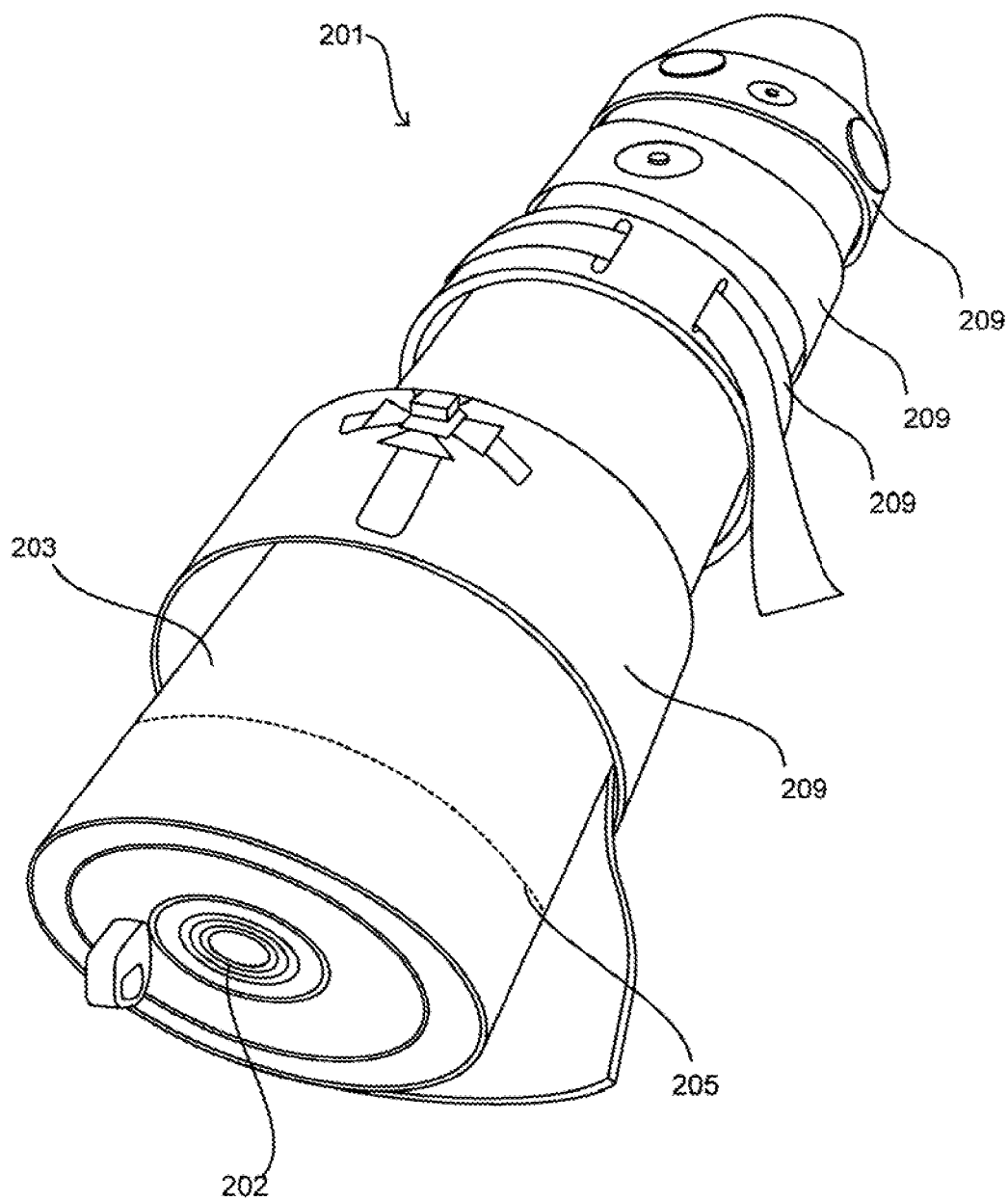
FIG. 10 is a drawing showing another embodied roll in the rolled up stored position with wrist or ankle jewelry stored on the outside of the roll and used to close the roll in a stored position.
Figure 16:
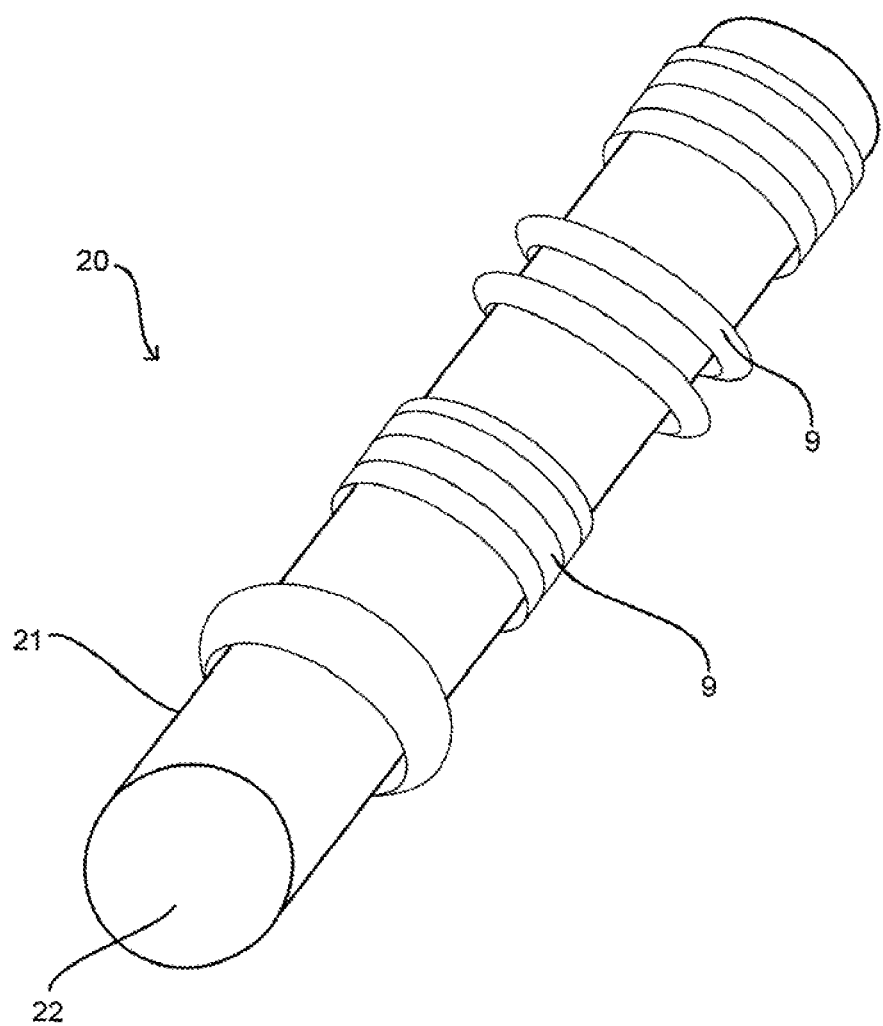
FIG. 16 is a drawing schematic of a wrist prosthesis that may be placed within an embodied roll.

Additionally, a similar embodiment features a wrist prosthesis 20 which may be made of any material as long as the prosthesis 20 is capable of allowing a variety of bracelets or watches 9 to be maintained in place on the prosthesis 20 until removed by the user (See FIG. 16). One preferred embodiment includes a prosthesis support tube 21 which may be a cardboard or plastic type poster tube, either with or without an additional external prosthesis coating 22 which may be the high coefficient of friction material, similar to the inner material 2 of the embodied roll. The diameter of the wrist prosthesis 20 approximates the size range of human wrists. Thus, there are multiple placement options for bracelets or watches 9 in the embodied rolls. One placement option includes merely placing the bracelets or watches 9 on the protective inner material 2 and rolling up, a second placement option includes placing watches or bracelets 9 around the rolled up roll (as shown in FIG. 10), and a third placement option includes placing watches or bracelets 9 on wrist prosthesis 20 and rolling the roll around the prosthesis 20. Optionally, the wrist prosthesis tube 22 may include an opening and closing cap (not shown) so that other important materials such as travel documents, and passports may be placed inside the tube 22 and protected.

Figure 17:
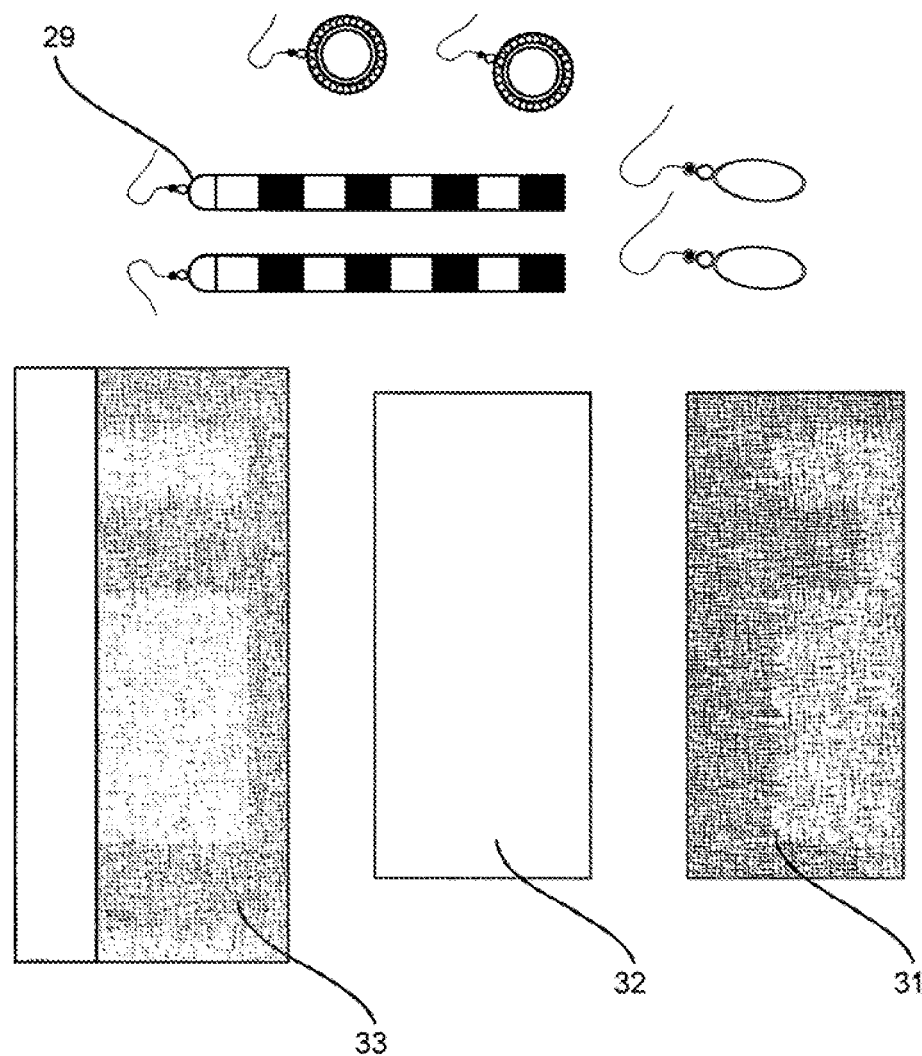
FIG. 17 is a drawing showing an earring holder arrangement and materials used to make an embodied earring holder.
Figure 18:
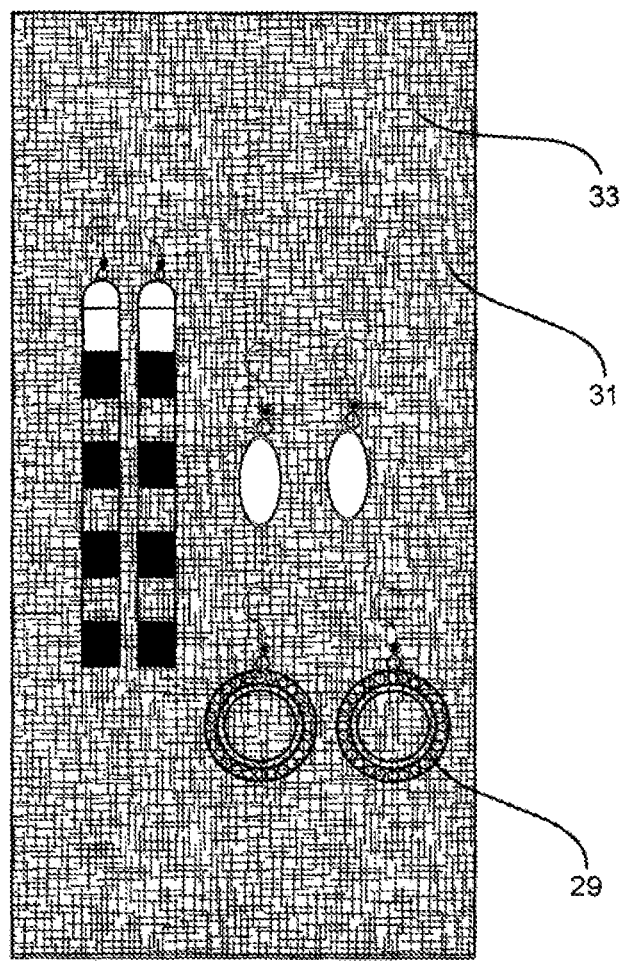
FIG. 18 is a drawing showing the completed earring holder arrangement of FIG. 17 loaded with earrings and ready to be stored within an embodied roll.

In regards to earring accessories, earrings 29 may be placed directly onto the inner material 2 and rolled up or fastened to an earring holder 30 (such as shown in FIGS. 17 and 18) comprising a support structure 32 with or without preformed holes or with or without an attached attachment material 31, and placed within the roll, or placed in the pouch 106 when present.

Figure 6:
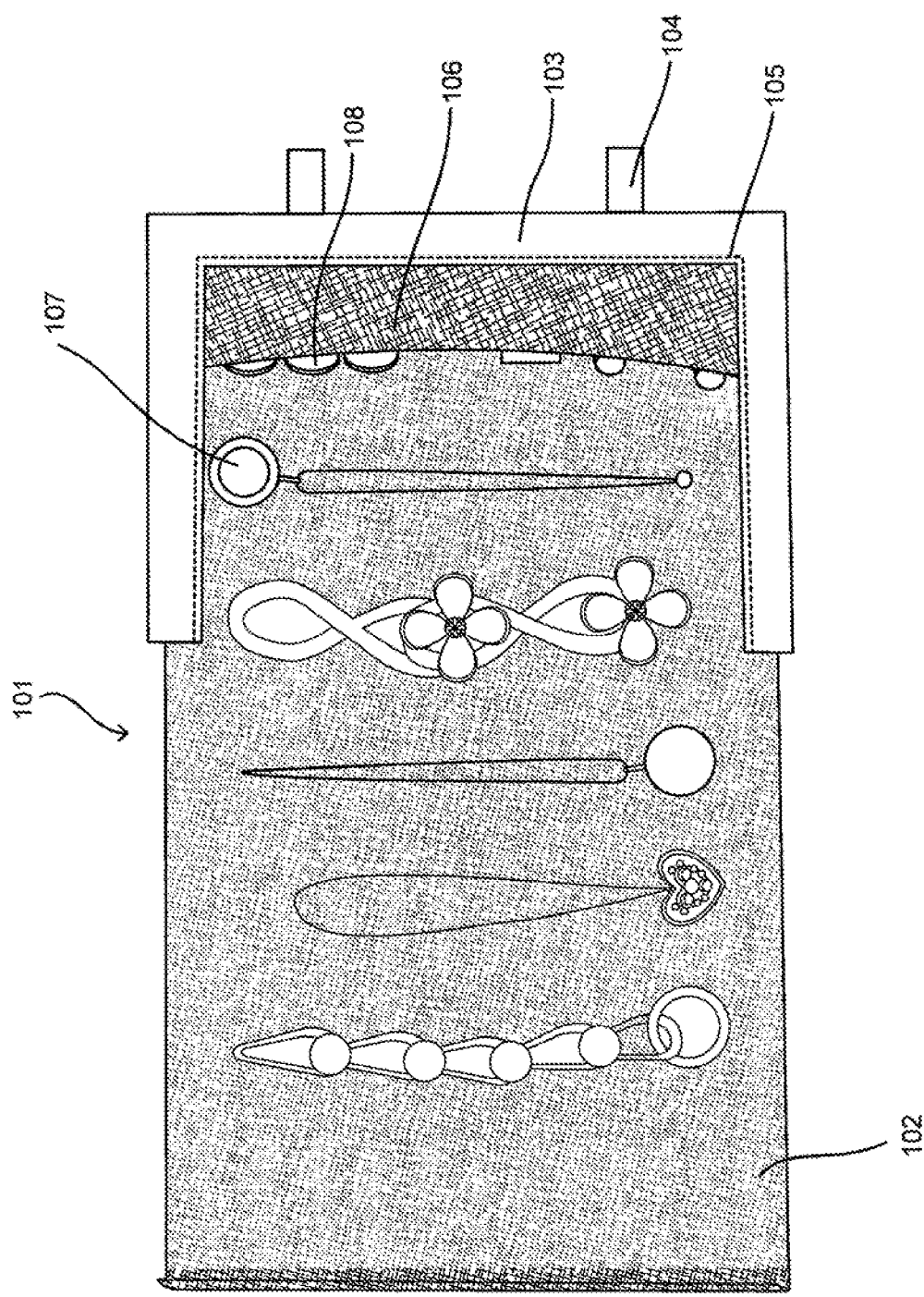
FIG. 6 is a drawing showing the embodied roll of FIGS. 4 and 5 in the fully laid out or open position but properly loaded with jewelry items.
Figure 7:
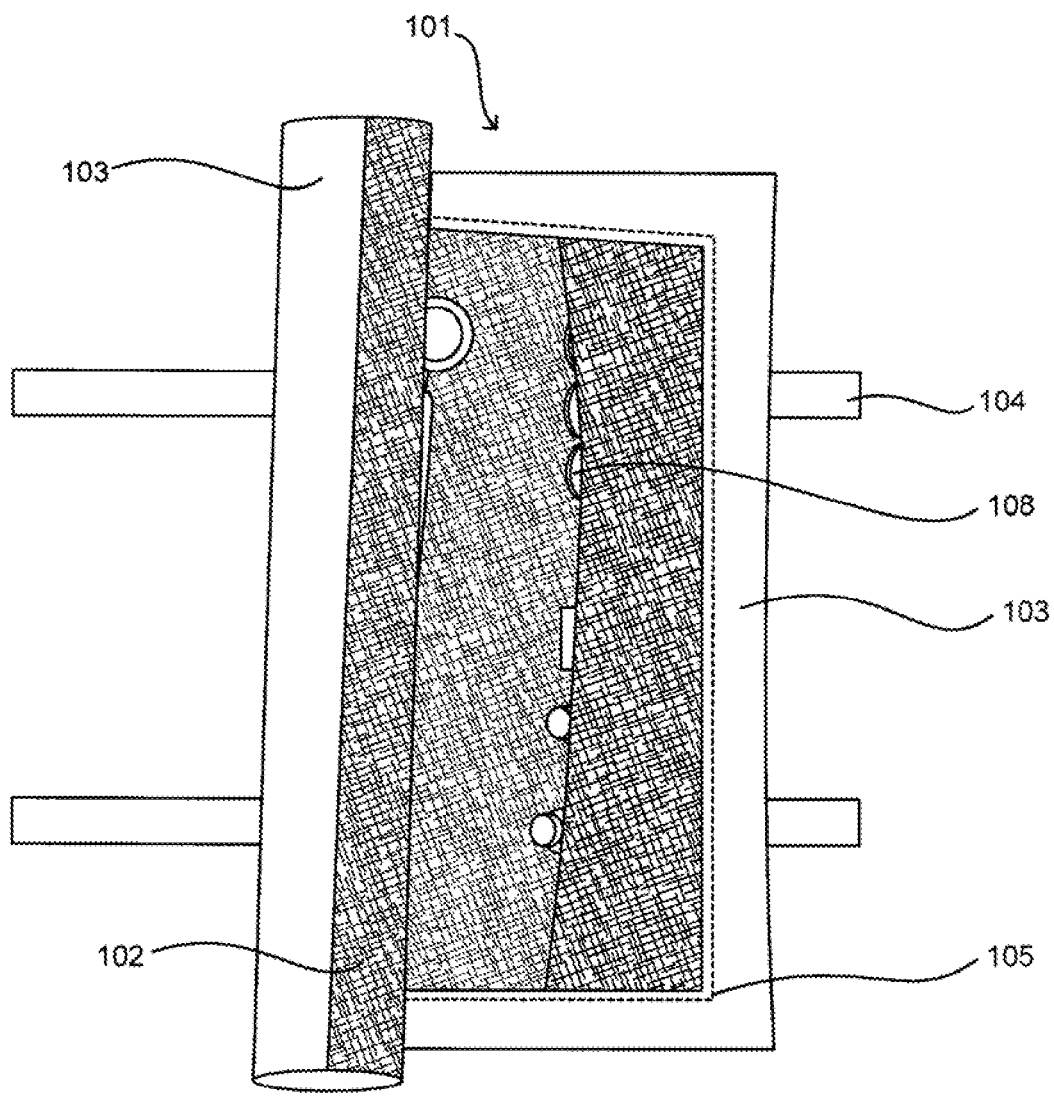
FIG. 7 is a drawing showing the embodied roll of FIGS. 4-6 in a partially rolled up position.
Figure 8:
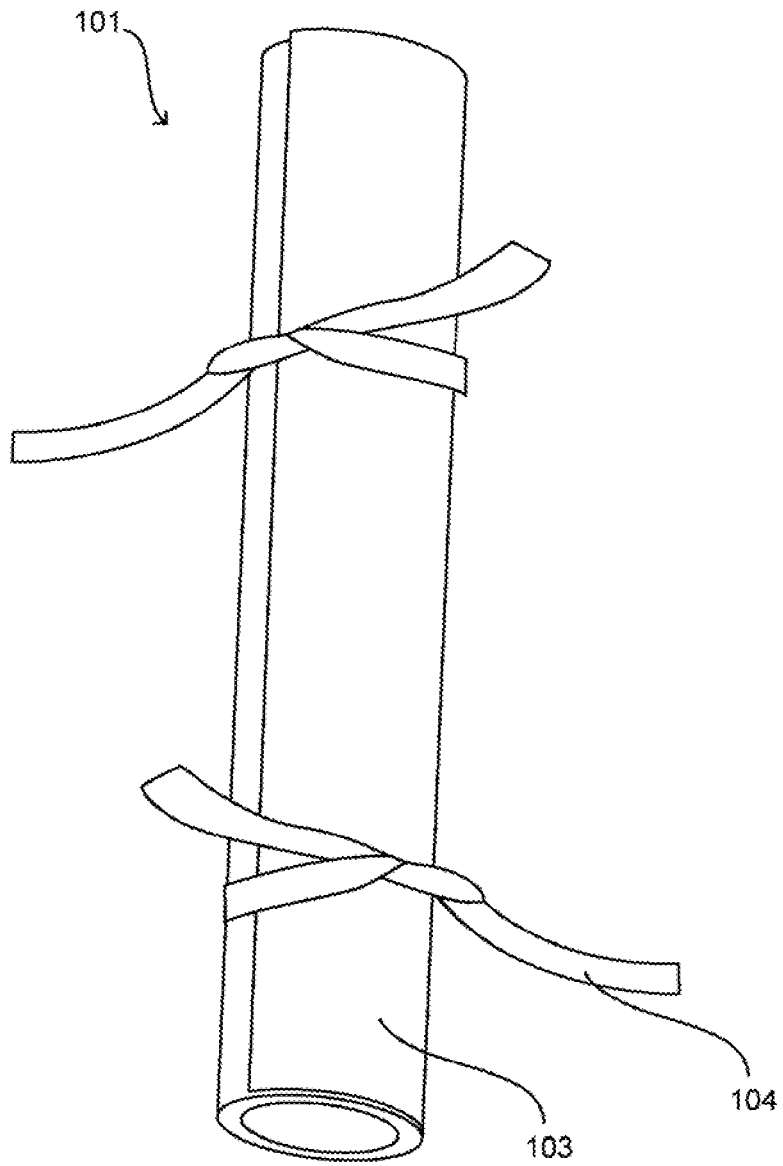
FIG. 8 is a drawing showing the embodied roll of FIGS. 4-7 in the rolled up stored position with securing straps tied and secured.

Generally embodied rolls may comprise of a smaller rectangular piece of pliable decorative materials upon which a longer rectangular piece of pliable rubberized material is attached. When the pliable rubberized material which has both anti-slip and cushioning properties are glued or sewn to the smaller rectangular decorative outer fabric the rubber material is longer and extends beyond the decorative material so that when the items are rolled the rubberized material almost exclusively contacts the items thus holding them in place securely and preventing the jewelry items from rubbing up against each other, potentially causing scratches or other damage. The absence of a plurality of pockets and compartments helps improve the packing process over the art and reduces the packing of items to a matter of laying the long items 7 perpendicular with the rolling direction Y (as shown in FIGS. 6-8) on the rubberized materials about an inch apart when packing and then rolling the roll up for transport storage, and simply unrolling and lifting the item out when using or putting away at the destination.

In more specific reference to the Figures the following Figures help serve as non-limiting examples of the disclosed embodiments.

Referring now in more detail FIG. 1 shows an interior view of an embodied roll 1 from the interior or inner side in its unrolled position. The embodied roll 1 features a decorative outer material 3, a rubberized inner material 2 and the optional securing straps 4. The rubberized inner material 2 is laid flat onto the inside of the decorative outer material 3 by gluing or sewing a ½ to 1 inch hem around the edges of the decorative outer material 3. On the side where the rubberized inner material 2 extends beyond the decorative outer material 3, the decorative outer material 3 is sewn and a hem 5 is created. On the other 3 sides both the decorative outer material 3 and the rubberized inner material 2 are sewn or glued together at the hem line 5. Additionally, a plurality of securing straps 4 can be attached to the outer surface of the outer material 3 and used to tie the roll into a stored closed position.

The rubberized inner material 2 is a mat (with a preferred range of about 12 to 18 inches wide by about 22 inches long) The mat is generally in the range of about 6 to 20 inches wide by about 10 to 40 inches long. The mat shown in the following figures is about 12 inches wide by about 22 inches long, upon which the jewelry items are to be placed, approximately an inch apart depending upon the size of the pieces. The optional securing straps 4 are partially visible where they extend out from the rectangular edge of the inner material 2 and the decorative outer material 3.

Referring now in more detail to FIG. 2 shows the decorative outer material 3 in full rectangular view. The rubberized inner material 2 is mostly visible where it extends beyond the decorative outer material 3. The part of the rubberized inner material 2 that is sewn onto the inner side of the decorative outer material 3 is not visible in this perspective, although the stitching of the hem line 5 is visible. The securing straps 3 are now fully visible in this perspective. They are shown attached with glue or stitching in a 2 to 3 inch area in the center of the outer material 3 the securing straps and on the exterior side of the decorative outer material 3, spaced apart by approximately 4 to 6 inches. The securing straps 4 extend outside of the rectangular piece of the decorative outer material 3 by several inches. The length is needed for the tying of the straps 4 to hold the roll 1 securely as is shown in FIG. 3. When the embodied roll is in its fully rolled up and securely tied position. The securing straps 4 are simply tied once and produce a secure way to keep the roll safely contained. The decorative outer material 4 is visible as it is the exterior view of the invention. The rubberized inner material 2 is not visible in this perspective as it is the inner portion that is wrapped around the jewelry which is also completely enclosed in this position.

Referring now in more detail to FIGS. 4-9 showing another embodied roll wherein the roll includes a pouch 106 for storing individual items are additional accessories such as finger prostheses 10 or earring holders 30.

Figure 4:
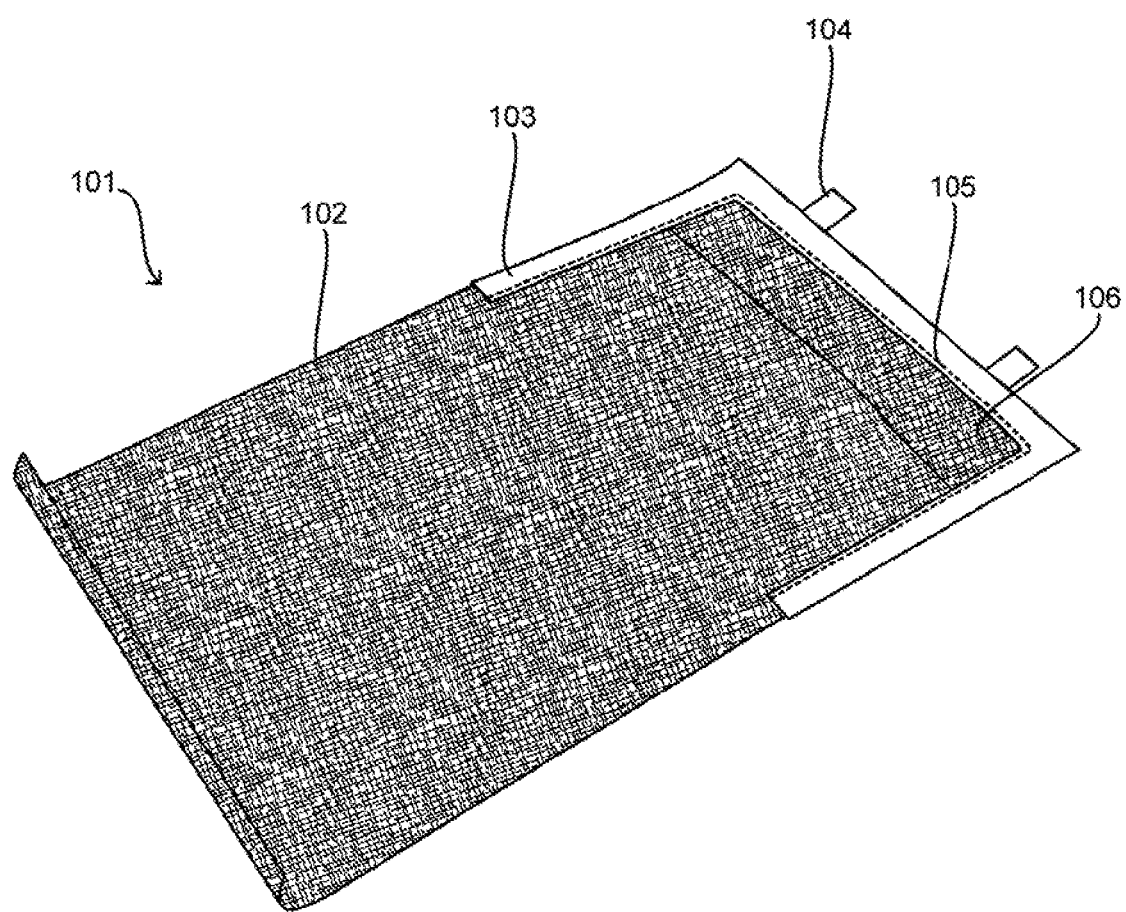
FIG. 4 is a drawing showing the interior surface of another embodied roll when in the fully laid out or ready to load position.
Figure 5:
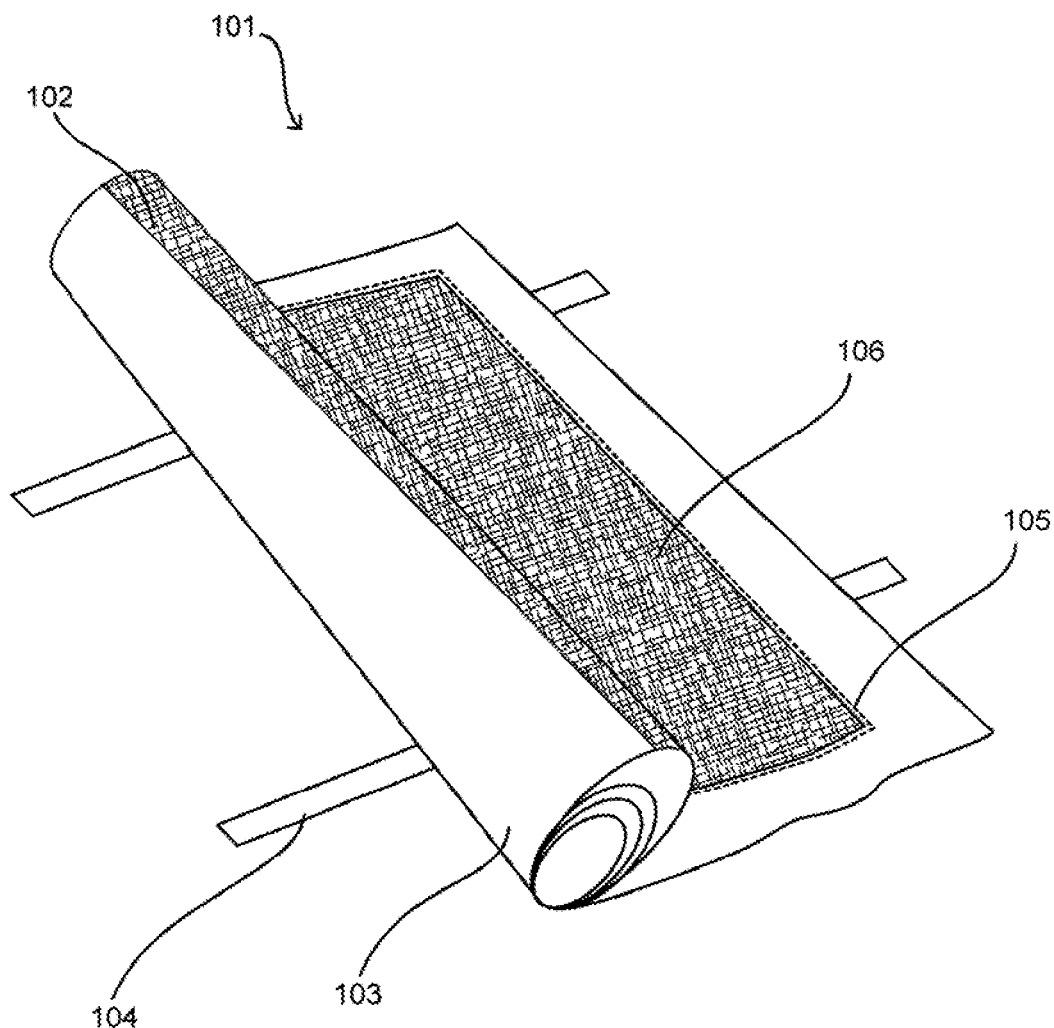
FIG. 5 is a drawing showing the embodied roll of FIG. 4 in a partially rolled up position.

Referring more specifically to FIG. 4, the interior surface of another embodied roll 101 is shown when in the fully laid out or ready to load position. The roll 101 comprises of the inner material 102 outer material 103 which is mated to each other along the hem attachment 105. Additionally, a pouch 106 has been created by folding over some of the inner material 102 to create an opening between two layers creating a pouch 106 that can be about 2 to 8 inches deep but is more commonly about 3 to 5 inches deep. FIG. 5 demonstrates the process of rolling up an unloaded roll 101, first the inner material 102 is rolled in the direction of the pouch 106 end of the roll 101, once the inner material 102 is first completely rolled in, a second final roll with the outer material 103 is rolled to the end such that only outer material 103 is exposed to external contact during transport or storage. The optional tying straps 104 are shown in the ready position to tie once the roll 101 is completely rolled up.

Referring now more specifically to FIG. 6 which shows the embodied roll of FIGS. 4 and 5 in the fully laid out or open position but properly loaded with jewelry items. In this view, neck or long jewelry pieces 107 are placed perpendicularly to the roll direction Y on the inner material 102 and smaller jewelry such as rings 108 are placed within the pouch 106. FIG. 7 shows the process of rolling up the items 107, 108 within the roll 101, wherein the roll 101 is rolled in the roll direction Y which is from the outer edge of the inner material 102 towards the outer edge of the outer material 103 near the hem line 105 attachment end, and towards the pouch 106 when present. FIG. 8 shows the roll 101 completely rolled up and secured with the securing ties 104 and that only the outer material 103 is fully exposed, and FIG. 9 further shows the roll 101 in a perspective view so that the relationship of the positioning of the inner material 102 is viewable as protected within the outer material 103 of the roll 101.

Referring to FIG. 10, another embodied roll 201 in the rolled up stored position is shown with wrist or ankle jewelry 209 stored on the outside of roll and used to close the roll 201 in the stored position without the use of securing straps. Additionally, the perspective of the protection that the outer material 203 provides over the inner material 202 and the stitching hem line 205 which is used to attach the inner material 202 to the outer material 203 is viewable in this Figure.

Figure 11:
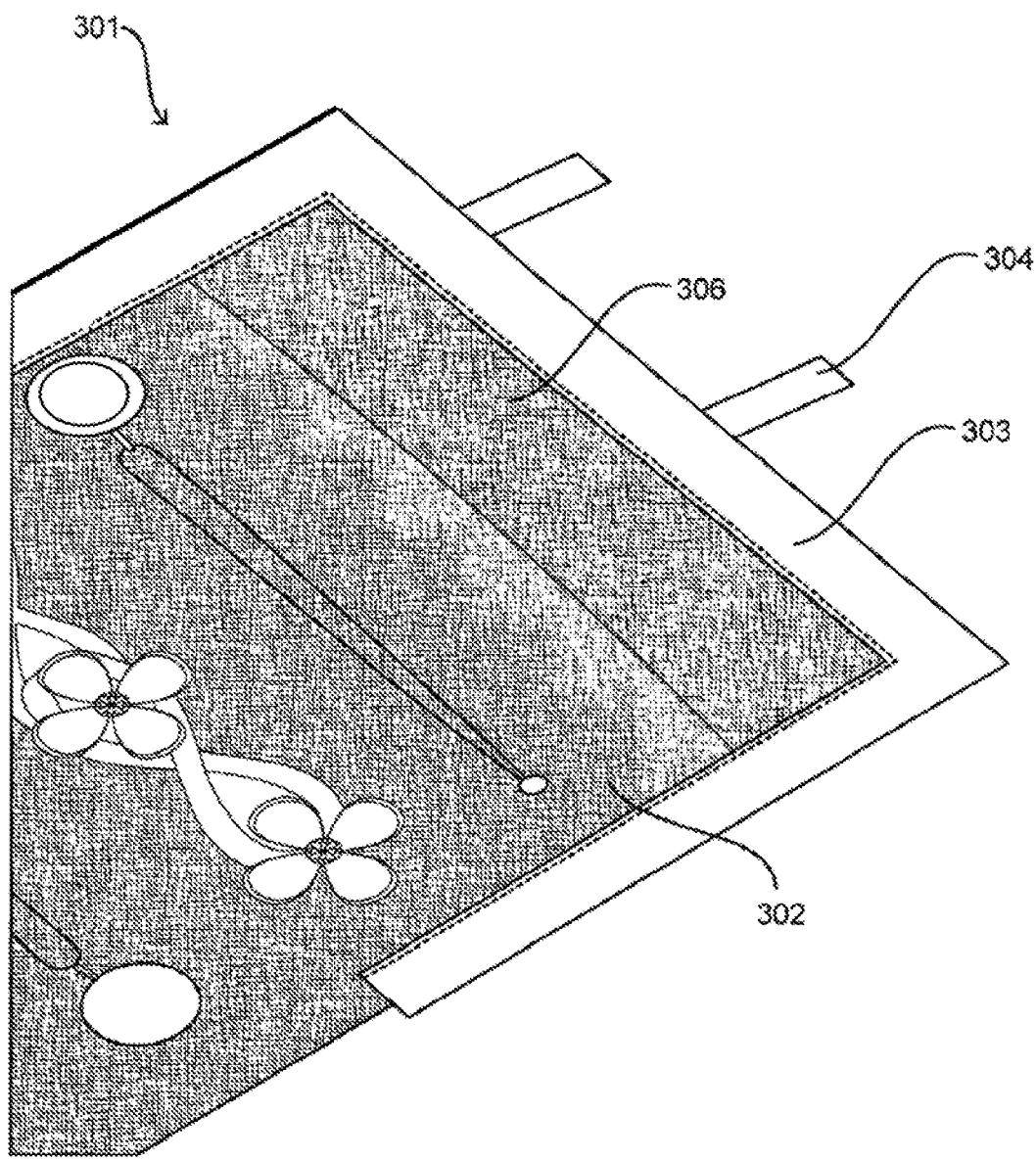
FIG. 11 is a drawing showing another embodied roll in the open position wherein an empty pouch for storing smaller items is visible.
Figure 12:
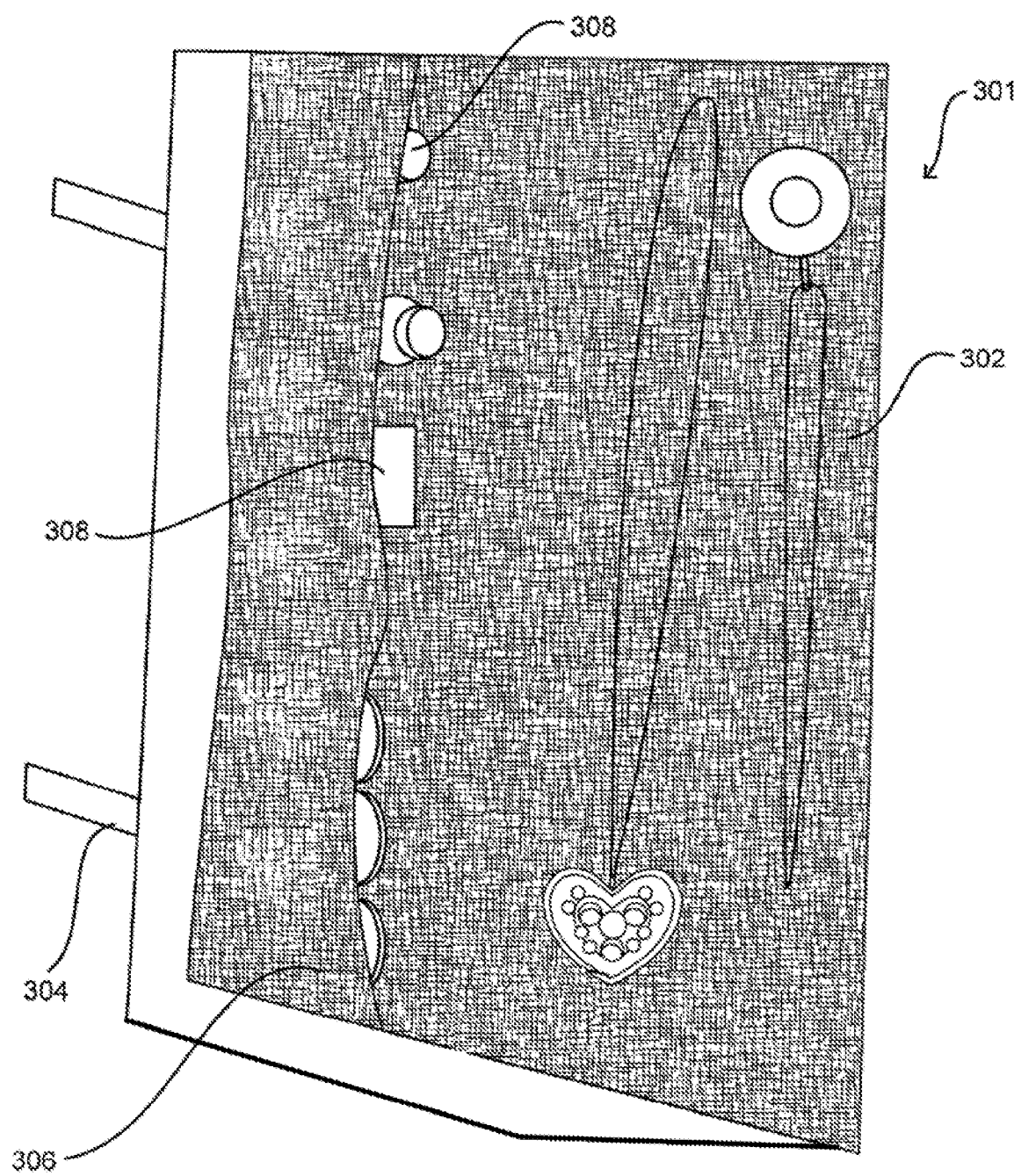
FIG. 12 is a drawing showing the embodied roll of FIG. 11 wherein the storage pouch is loaded with jewelry items in a stored position.

Referring now to FIGS. 11 and 12, another embodied roll 301 is featured with a more close up view of a pouch system 306 used for the storage of smaller items (such as rings 308 or earrings 329) or accessory components (such as finger prostheses 10, 310 or earring holders 30, 330). FIG. 11 shows the pouch 306 while empty whereas FIG. 12 shows the pouch 306 loaded with rings 308. The featured travel roll 301 has a pocket or pouch area 306 resulting from the folded over inner material 302. In this embodiment, the inner material is two layers thick at the joining of the inner 302 and outer material 303 for approximately 4 to 5 inches. The inner material 302 is folded at one end and the folded area is the part that is the long edge sewn over with the decorative outer fabric 303. Proceeding from the edge is 3 to 4 inches of two layers of cushion material or inner material 302 which results in the pocket-like area 306. The pocket-like area 306 serves as a place where rings 308 and earrings 330 can be inserted for maximum protection and securely held in place. FIG. 12 shows how the rings 308 and earrings (not shown) look when slipped into the flap or pocketed area 306. The folding over of the inner material 2 creates a flap or pocket in the area approximately 3 inches from the edge.

Figure 9:
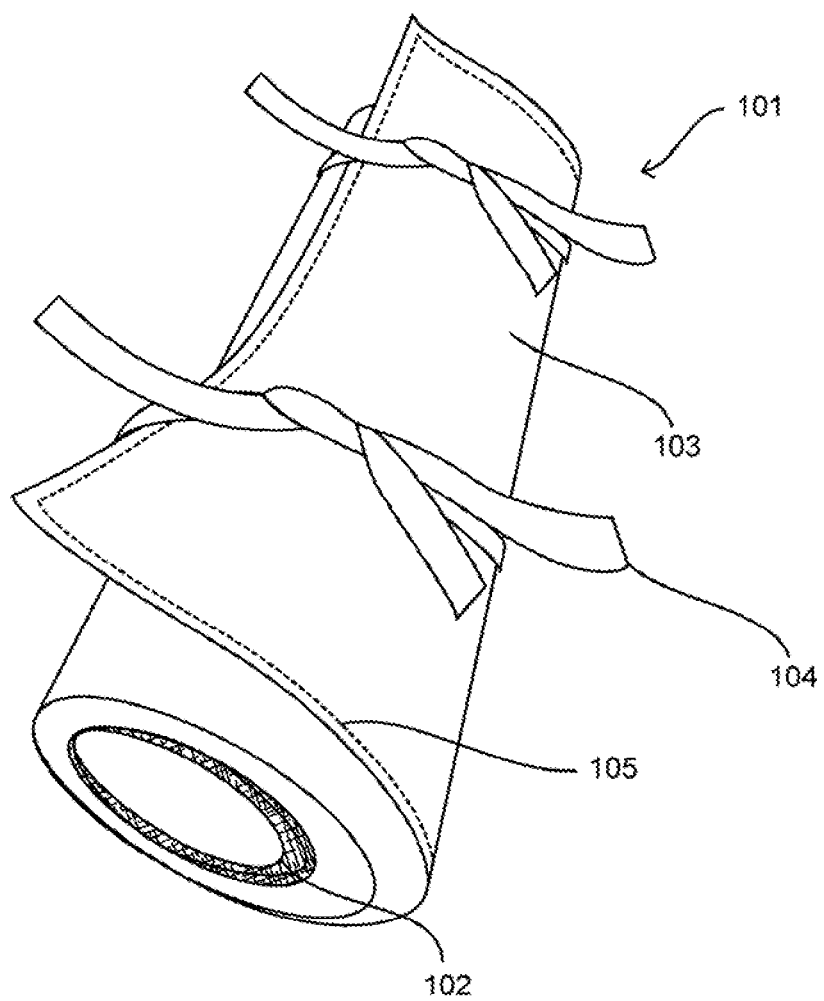
FIG. 9 is another drawing showing the embodied roll of FIGS. 4-8 in the rolled up stored position with securing straps tied and secured and wherein the inner material is visible in a perspective view.
Figure 13:
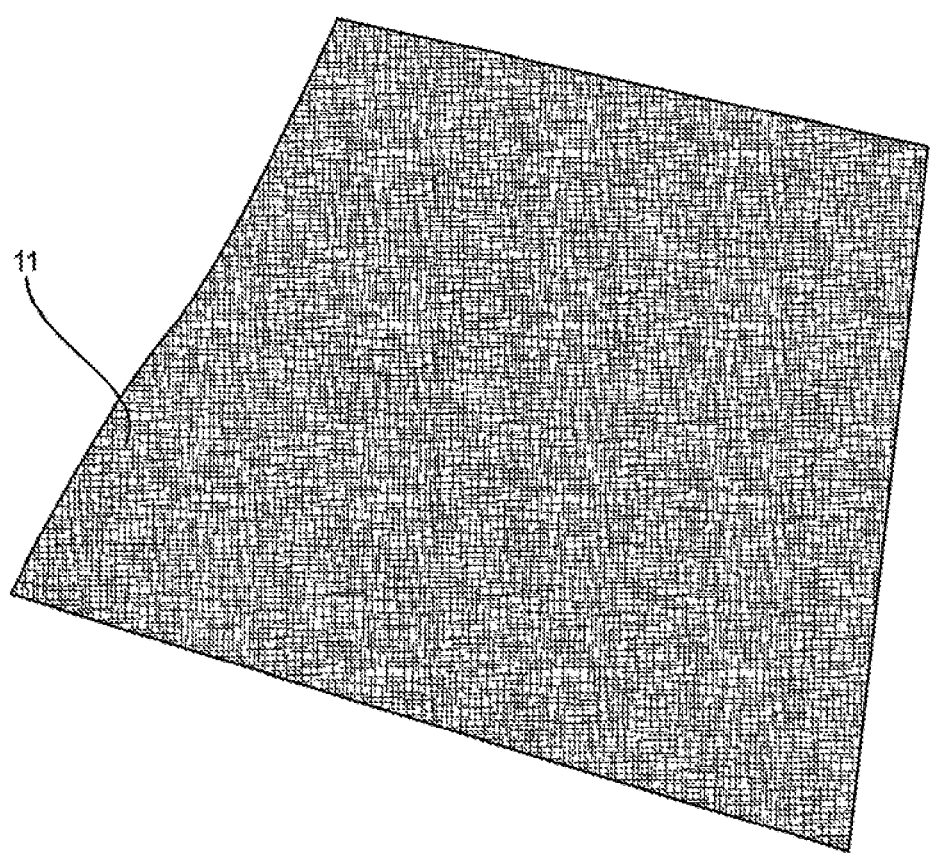
FIG. 13 is a drawing showing exemplary finger prosthesis material before being rolled up.
Figure 14:
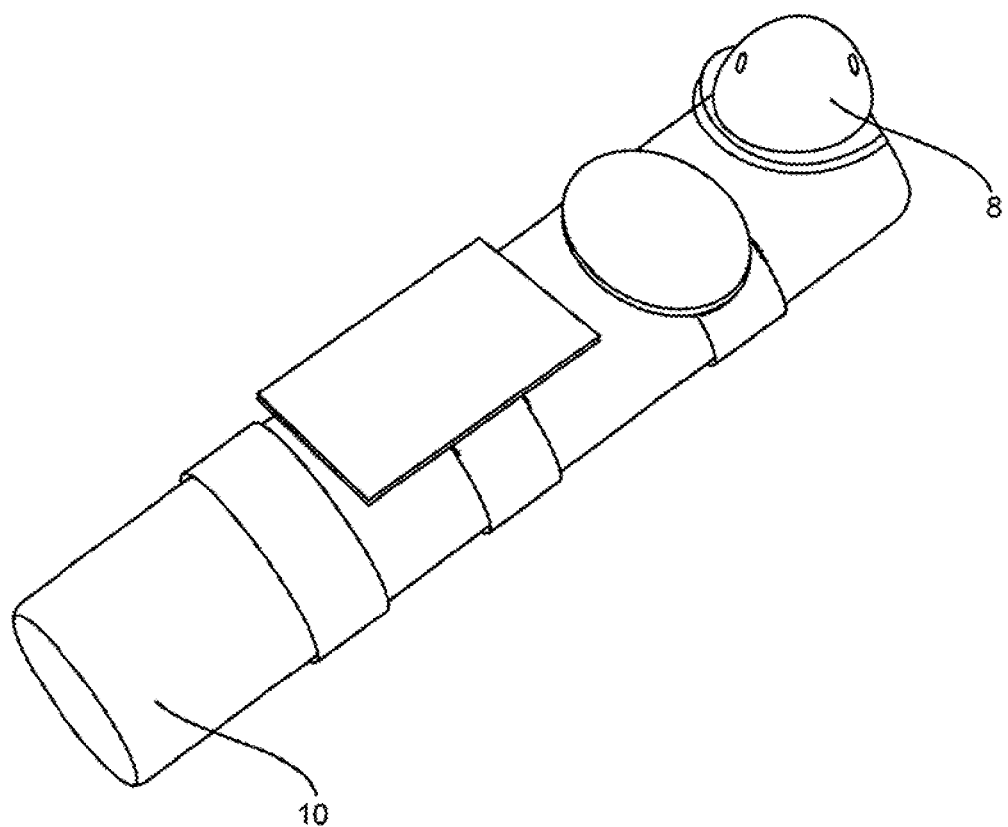
FIG. 14 is a drawing showing the finger prosthesis material of FIG. 13 rolled up into a finger prosthesis and including jewelry items stored upon.
Figure 15:
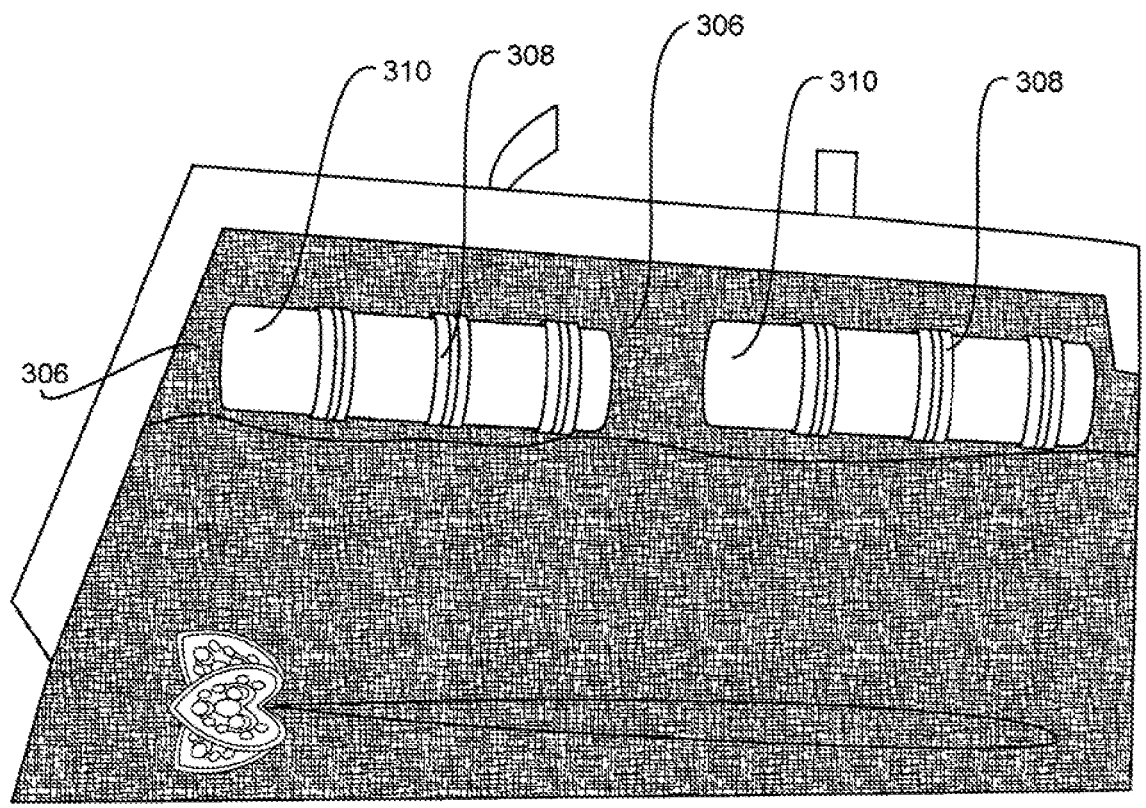
FIG. 15 is a drawing showing another embodied roll with a storage pouch and also two finger prostheses that may be either rolled into the roll or placed into the storage pouch.

Referring now to FIGS. 13-15, FIG. 13 shows exemplary finger prosthesis material 11 before being rolled up into a finger prosthesis 10 as shown in FIG. 14. The accessory ring prosthesis 10 shown comprises the same material used for inner material 2 but rolled up in the general shape of a human finger. The material before being rolled up is generally about 4×7 inches. The rings are slid onto the roll and held securely. FIG. 14 additionally shows the finger prostheses 10 loaded with a variety of rings 8. FIG. 15 shows a plurality of finger prostheses 310 ready to be used as accessories for the embodied roll 301 featured in FIGS. 11 and 12. The finger prostheses 310 can be placed perpendicularly to the roll direction Y on the inner material 302 and rolled up, or the finger prostheses 310 may be placed perpendicularly to the roll direction Y but within the pouch 306 and held in the pocket 306 and rolled up within the roll 301 when stored. Referring now in more detail to FIG. 9 is the ring holder accessory shown lying on the inner material protective sheet 2.

Referring now in more detail to FIG. 16 is the wrist prosthesis accessory 20. It is comprised of a rigid cardboard roll approximately 3 to 4 inches in diameter and 4 to 12 inches in length. The cardboard roll is covered with inner material 2 the cushion material which helps the bangle bracelets to keep from moving. The width of the bangles and the roll length determine how many bangles can be put onto the optional bangle roll.

Referring now in more detail to FIGS. 17 and 18 showing an earring holder accessory 33. FIG. 17 shows the individual pieces composed of a 3×6 inch piece of rigid cardboard or plastic 31 wrapped by a piece of cushioning material 32 which when glued together make the earring holder apparatus 33. The holder 33 is glued on one side but open on the other. The unglued side is where the earrings are secured. FIG. 18 shows the completed earring holder arrangement 33 of FIG. 17 loaded with earrings 29 and ready to be stored within an embodied roll.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A travel roll configurable between a rolled configuration and an unrolled configuration, the travel roll comprising:
   a) an outer material end;
   b) an extended inner material end;
   c) an inner material that is rectangular in shape having a length and a width, and having an inner surface consisting of an attachment material having a coefficient of friction of at least 0.5 against a metal surface to retain one or more items to the inner surface of the attachment material;
   wherein the inner material has an outer surface consisting of the attachment material to secure said one or more items to the outer surface of the attachment material;

wherein the inner surface of the attachment material has no item attachment features attached thereto such that when the roll is in the rolled configuration, only the inner material comes in direct contact with the one or more items to retain the one or more items;

d) an outer material that is rectangular in shape having a length and a width and configured over the outer surface of the inner material on the outer material end and extending no more than 50% of the length of the inner material, wherein the outer material extends across substantially the entire width of the inner material;

wherein the inner material is rolled from the extended inner material end toward the outer material end to form said travel roll into the rolled configuration;

wherein the outer material extends completely around a circumference of the travel roll when in said rolled configuration;

wherein the outer surface of the attachment material contacts the one or more items located on the inner surface of the attachment material when the travel roll is rolled from the extended inner material end toward the outer material end;

wherein the one or more items are retained by contact with and between the inner surface and the outer surface of the attachment material when the travel roll is in said rolled configuration, and wherein the outer material and inner material are different materials.

2. The travel roll of claim 1, wherein the one or more items comprises a piece of jewelry.

3. The travel roll of claim 1, wherein the one or more items comprises a tool.

4. The travel roll of claim 1, wherein the attachment material has a coefficient of friction of at least 0.7 against a metal surface.

5. The travel roll of claim 1, wherein the attachment material is a polymeric material.

6. The travel roll of claim 5, wherein the attachment material is pressure sensitive adhesive material.

7. The travel roll of claim 5, wherein the attachment material has a hardness of no more than 50 Shore A.

8. The travel roll of claim 5, wherein the attachment material has a hardness of no more than 50 Shore OO.

9. The travel roll of claim 5, wherein the attachment material is an elastic material, wherein the attachment material will return substantially to an original shape after removal of a deforming load.

10. The travel roll of claim 1, wherein the inner material is a single piece of attachment material that extends from the inner surface to the outer surface.

11. The travel roll of claim 1, wherein the outer material is a fabric.

12. The travel roll of claim 1, wherein the inner material is folded back toward the inner surface of the inner material to form a pouch.

13. The travel roll of claim 12, wherein the pouch extends a length from the outer material end toward the extended inner material end of two to five inches.

14. The travel roll of claim 1, wherein the length of the inner material is between 10 to 40 inches.

15. The travel roll of claim 1, further comprising a securing strap attached to the outer material and extending from the outer material end that extends around the travel roll to secure the travel roll in said rolled configuration.

16. A method of packing one or more items providing the steps of:
   a) providing the travel roll of claim 1;
   b) placing the one or more items onto the inner surface of the attachment material while the inner material is unrolled; and
   c) rolling the inner material from the extended inner material end toward the outer material end to form said travel roll into the rolled configuration.

17. The method of packing one or more items of claim 16, wherein the one or more items comprises a piece of jewelry.

18. The method of packing one or more items of claim 16, wherein the outer material is a fabric.

* * * * *